US005466372A

United States Patent [19]

Jerabek et al.

[11] Patent Number: 5,466,372

[45] Date of Patent: Nov. 14, 1995

[54] CYCLONE INCLUDING AN INLET DIFFUSER TUBE

[75] Inventors: Michael Jerabek, Bernstadt; Wolfgang Ruf, Heidenheim; Thomas Martin, Langenau, all of Germany

[73] Assignee: J. M. Voith GmbH, Heidenheim, Germany

[21] Appl. No.: 216,921

[22] Filed: Mar. 23, 1994

[30] Foreign Application Priority Data

Mar. 26, 1993 [DE] Germany .......................... 43 09 920.3

[51] Int. Cl.[6] .................................................... B01D 21/26

[52] U.S. Cl. ....................... 210/512.1; 210/787; 209/727; 209/732

[58] Field of Search ................................ 210/512.1, 787, 210/188; 209/715, 721, 725, 730, 732; 55/459.1–459.5, 456

[56] References Cited

U.S. PATENT DOCUMENTS

| | | | |
|---|---|---|---|
| 2,756,878 | 7/1956 | Herkenhoff | 209/211 |
| 3,306,444 | 2/1967 | Troland | 209/732 |

FOREIGN PATENT DOCUMENTS

| | | |
|---|---|---|
| 178348 | 4/1954 | Austria . |
| 1518253 | 3/1968 | France . |
| 1072024 | 12/1959 | Germany . |
| 1767699 | 9/1971 | Germany . |

OTHER PUBLICATIONS

PTO 95–528 English Translation of DE–AS 1072024 Stockholm, Dec. 1959.

*Primary Examiner*—Robert A. Dawson
*Assistant Examiner*—David Reifsnyder
*Attorney, Agent, or Firm*—Marshall, O'Toole, Gerstein, Murray & Borun

[57] ABSTRACT

A wet cyclone having a slender body with a truncated cone at an end thereof includes a heavy fraction outlet at an apex of the truncated cone and an immersion tube on the other end of the body. The immersion tube is cylindrical for withdrawal of a light non-gaseous fraction. A diffuser within the immersion tube deflects the flow within the tube for recovery of pressure head. The diffuser is disposed at a distance from the inlet end of the immersion tube of at least about half the inside diameter of the immersion tube.

10 Claims, 1 Drawing Sheet

CYCLONE INCLUDING AN INLET DIFFUSER TUBE

BACKGROUND OF THE INVENTION

1. Field of the Invention

The invention relates to separators and in particular to wet cyclone separators.

2. Description of Related Technology

A wet cyclone separator having a slender body with a truncated cone at one end thereof and an immersion tube at another end thereof is known from DE 1 072 024. Such a wet cyclone includes a heavy fraction outlet end at an apex of the truncated cone. The immersion tube is cylindrical, rather than conical, and is therefore adapted for the withdrawal of a substantially non-gaseous light fraction from the cyclone. A diffuser within the immersion tube deflects the flow within said tube for the purpose of recovering pressure head.

In such a wet cyclone, the vanes of the diffuser disposed in the immersion tube have a curved leading edge. The vanes are typically curved plates. The importance of the curved leading edge of the vanes has been emphasized in the art of separating fiber suspensions.

SUMMARY OF THE INVENTION

It is an object of the invention to overcome one or more of the problems encountered with the wet cyclones described above. It is also an object of the invention to provide a wet cyclone which does not require a diffuser having a curved leading edge. Furthermore, it is an object of the invention to provide a wet cyclone which utilizes a cylindrical immersion tube rather than a conically shaped tube because, for example, straight, cylindrical immersion tubes are simpler to fabricate.

According to the invention, a wet cyclone having a substantially slender body, a truncated cone at one end thereof, and an immersion tube at another end thereof includes a heavy fraction outlet end at an apex of the truncated cone. The immersion tube is substantially cylindrical for withdrawal of a substantially non-gaseous light fraction. A diffuser within the immersion tube deflects the flow within the immersion tube for the purpose of recovering pressure head. The diffuser is disposed at a distance from an inlet end of the immersion tube of at least about half an inside diameter of the immersion tube.

Other objects and advantages of the invention will be apparent to those skilled in the art from the following detailed description taken in conjunction with the drawings and the appended claims.

DETAILED DESCRIPTION OF THE INVENTION

Figure 1:
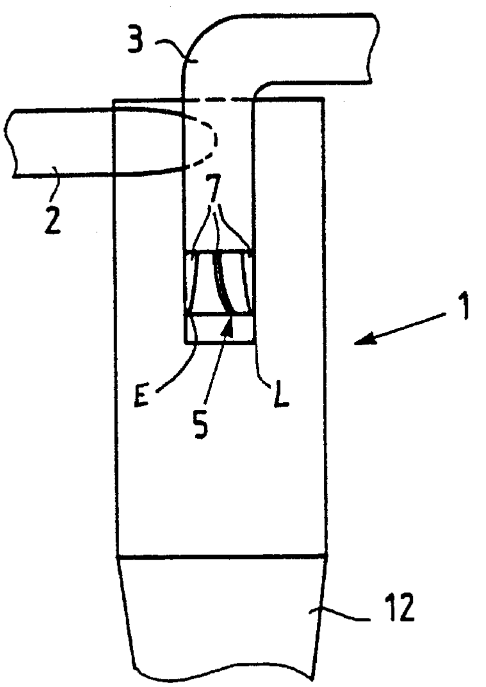
FIG. 1 is a partially schematic axial cross-section of a device according to the invention.

A device according to the invention is described below with reference to FIGS. 1—3. With reference to FIG. 1, a device according to the invention is a wet cyclone, generally designated 1, having a tangential inflow tube 2, a conical lower part 12, and a central immersion tube 3 (i.e. take-off tube) partially disposed above the cyclone 1 and extending into an inlet region thereof. A diffuser 5 having guide vanes 7 is disposed within the immersion tube 3 at a selected distance from an inlet or leading end L of the tube 3. The distance between the diffuser at a leading edge E of the vanes 7 and the leading end L of the immersion tube 3 is at least equal to half the inside diameter of the immersion tube 3. For example, if the inside diameter of the immersion tube is about 50 mm, then the smallest distance between the leading edge E of the vanes 7 and the leading end L of the immersion tube 3 is set at about 25 mm. Trouble-free operation of the diffuser 5 is made possible in this fashion because interfering liquid flow about the edges of the vanes 7 of the diffuser 5 and the end of the immersion tube 3 in the inlet region of the immersion tube are avoided.

Figure 3:
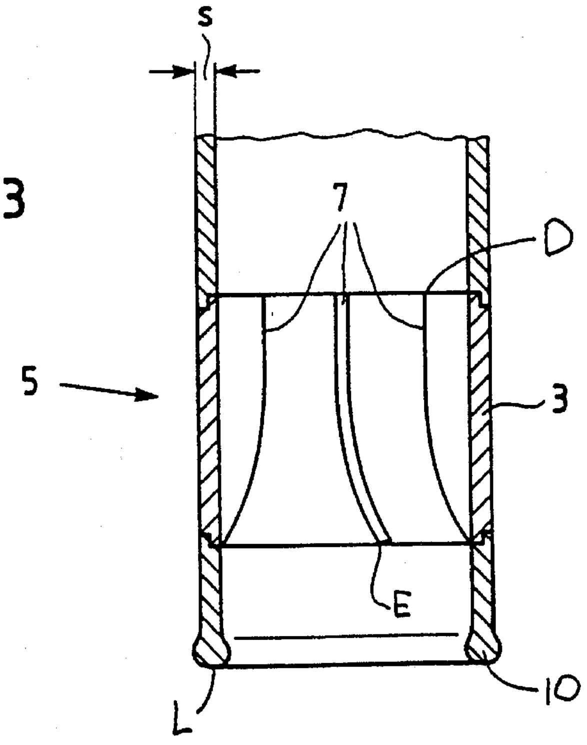
FIG. 3 is an enlarged partially schematic axial cross-section of the device shown in FIG. 1 showing a diffuser and an inlet region of an immersion tube.

FIG. 3 illustrates that the leading end L of the immersion tube 3 is rounded with a radius of curvature between about 0.65 times and 0.9 times a wall thickness s of the immersion tube 3. The immersion tube wall also preferably includes a thickened portion or lip 10 disposed near the end L. The rounded lip 10 is preferably at least partially disposed within the immersion tube. The thickened portion or lip 10 substantially counters secondary flows in the inlet region of the immersion tube 3.

For application in the separation of fiber suspensions, the vanes 7 are substantially pointed in an inlet region of the immersion tube 3. A radial inside edge of each vane 7 roughly follows a parabolic or hyperbolic curve (i.e. is a branch of a parabola or a hyperbola). The curved vanes 7 provide a substantially impact-free impingement of fluid flow at the inlet region of the diffuser 5. The curvature of the vanes 7 diminishes from the inlet region of the diffuser 5 to an outlet end D thereof (i.e. diminishes with respect to the direction of fluid flow through the tube 3) so that the vanes 7 are substantially evenly straight (i.e. not curved) at the diffuser outlet end D. At the end D, each vane 7 is substantially congruent with a radial plane of the cyclone 1 (and the immersion tube 3) drawn therethrough. The radial extent of each vane (i.e. the maximum width of the vane at the inlet region of the diffuser 5) is equal to between about 15% and about 30% an inside diameter of the immersion tube 3. At the outlet end D, the radial extent of the vane is reduced to zero.

Only a few vanes 7 need be used in a device according to the invention, as is also known from DE 1 072 024 that spacing between the vanes of about one-fourth fourth of the inside diameter of the immersion tube is sufficient. In practice, this means that the diffuser typically has about four vanes.

Figure 2:
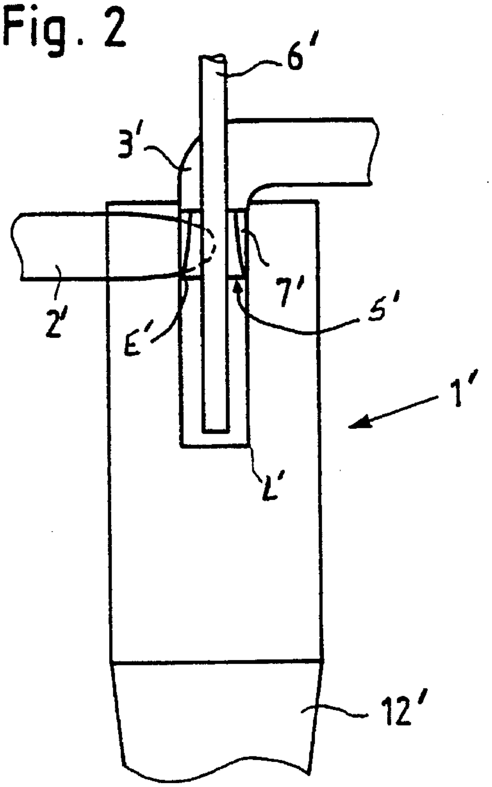
FIG. 2 is a partially schematic axial cross-section of a second embodiment of a device according to the invention.

Another embodiment of a device according to the invention is shown in FIG. 2. The device includes elements identified by the reference numerals 1', 2', 3', 5', 7', and 12' similar in design and function to the elements identified by reference numerals 1, 2, 3, 5, 7, and 12, respectively, described herein with respect to FIG. 1. Furthermore, the embodiment shown in FIG. 2 includes a gas take-off tube 6' disposed within the immersion tube 3' and oriented substantially concentrically therewith. Also, the diffuser 5' is disposed at a somewhat greater distance from an inlet end L' of the immersion tube 3' than the distance between the diffuser 5 and the immersion tube end L described with respect to FIG. 1. The distance between the inlet end L' of the immersion tube 3' and a diffuser vane edge E' is at least approximately equal to the inside diameter of the immersion tube and preferably at least 170% of the inside diameter of the immersion tube 3'. Because of the gas take-off tube, the radial extent of each vane 7' (i.e. the maximum width of the vane at the inlet region of the diffuser 5') is between about 15% and about 20% of the diameter of the immersion tube 3.

Wet cyclones according to the invention do not require immersion tubes of extended length because the tubes are built into the device in such a manner that additional friction losses do not occur.

The foregoing detailed description is given for clearness of understanding only, and no unnecessary limitations should be understood therefrom, as modifications within the scope of the invention will be apparent to those skilled in the art.

We claim:

1. In a wet cyclone having a substantially slender body having a truncated cone at an end thereof and a cylindrical immersion tube extending into another end thereof, a heavy fraction outlet end at an apex of the truncated cone, and a diffuser disposed within the immersion tube for deflecting flow within said tube for recovering pressure head wherein the immersion tube is adapted for the withdrawal of a substantially non-gaseous light fraction, the improvement wherein the diffuser is disposed at a distance from an inlet end of the immersion tube of at least about half an inside diameter of the immersion tube and wherein the diffuser comprises a plurality of vanes, each vane having a radial extent of between about 15% and about 30% of the inside diameter of the immersion tube.

2. The improvement of claim 1 further comprising a gas take-off tube disposed within and oriented concentrically with the immersion tube, wherein the distance between the diffuser and the inlet end of the immersion tube is at least about equal to the inside diameter of the immersion tube.

3. The improvement of claim 2 wherein the distance between the diffuser and the inlet of the immersion tube is at least equal to about 1.7 times the inside diameter of the immersion tube.

4. The improvement of claim 2 wherein the diffuser comprises a plurality of vanes, each vane having a radial extent of between about 15% and about 20% of the inside diameter of the immersion tube.

5. The improvement of claim 1 wherein the inlet end of the immersion tube has a radius of curvature of between about 0.65 times and about 0.9 times a wall thickness of the immersion tube.

6. The improvement of claim 1 wherein the immersion tube has a substantially rounded lip at the inlet end thereof.

7. The improvement of claim 6 wherein the lip is disposed at least partially within the immersion tube.

8. The improvement of claim 1 wherein the diffuser comprises a plurality of vanes, each vane having a maximum radial extent at an inlet region of the diffuser of about 20% the inside diameter of the immersion tube and narrowing to a radial extent of zero at an outlet end of the diffuser.

9. The improvement of claim 8 wherein each vane defines a branch of at least one of a parabola and a hyperbola.

10. The improvement of claim 1 wherein the diffuser comprises a plurality of curved vanes, each vane being adapted for the impact-free impingement of fluid flow at an inlet region of the diffuser, the curvature of each vane diminishing downstream relative to the direction of fluid flow to result in a substantially straight vane portion at an outlet end of the diffuser, said straight portion being congruent with a radial plane of the cyclone.

* * * * *